United States Patent Office 3,138,581
Patented June 23, 1964

3,138,581
SURFACE ACTIVE ACYLATED AMIDATED PEPTIDES AND POLYPEPTIDES
Harland H. Young, Western Springs, and Kurt H. Spitzmueller, Clarendon Hills, Ill., assignors to Swift & Company, Chicago, Ill., a corporation of Illinois
No Drawing. Filed Oct. 12, 1959, Ser. No. 845,666
8 Claims. (Cl. 260—112)

This invention relates in general to surface active compositions and more particularly to the conversion of proteins and hydrolysis products of proteins to acylated amides having useful properties in the field of wetting, dispersing, emulsifying and washing.

In our copending application, Serial No. 820,848, filed June 17, 1959, a new and improved method for amidating proteinaceous materials and polypeptides derived from proteinaceous materials is described. Briefly the method comprises heating and reacting a proteinaceous material with a water-soluble amine-supplying composition such as an aliphatic mono amine substituted either with amine groups or hydroxyl groups under essentially anhydrous conditions to provide amidated peptides and amidated polypeptides of varying degrees of polymerization. The extent to which this condensation reaction is permitted to proceed determines how completely the protein is broken down into smaller units and also determines the molecular size of the units. The method permits conversion of by product protein values into reactive bifunctional compositions which undergo many of the reactions of alkylolamines and polyamines. Moreover, it is possible to convert low cost proteins into amides or alkylolamides of peptides, these derivatives having a desired molecular weight and possessing many of the properties of the reacting polyamine or alkylolamine.

Although these amidated peptides are valuable compositions, further enhancement of the complex mixture is possible by acylation of the amidated product with an aliphatic carboxylic acid or ester thereof. Acylation results in a substantial increase in lipophilic properties and converts the amides into highly valuable surface active compositions.

Acylation of proteins has been known heretofore, although one of the best-known methods, namely the Schotten-Baumann reaction is not very satisfactory, particularly where it is desired to provide a smooth, economical reaction and a reaction product which is substantially free of impurities. This reaction involves the treatment of the protein in aqueous alkaline solution with an acid chloride. Attempts to acylate proteins by other methods have for the most part been unsuccessful.

It is therefore an object of this invention to provide new and useful surface active compositions derived from proteinaceous materials.

Another object of this invention is the provision of a method whereby proteinaceous materials are acylated to convert these proteinaceous materials to compositions having desirable surface active properties.

Additional objects, if not specifically set forth herein, will be readily apparent from the detailed description of the invention which follows:

Broadly, the invention is concerned with the production of valuable new surface active compositions from proteins and protein derivatives, particularly polypeptides. The surface active agents comprise the complex mixtures prepared by acylating amidated proteins or reacting amidated peptides with acylating agents. The compositions may be characterized as acylated polypeptide amides or as fatty acid amides with high molecular weight amines or as fatty acid esters of high molecular weight aliphatic alcohols. In the treatment of proteins under essentially anhydrous conditions with alkyl polyamines and/or alkylolamines as described in our application Serial No. 820,848 of which the present application is a continuation in part, the molecular weight of the amidated peptide will depend upon the extent to which the reaction is allowed to proceed. More drastic or extended reaction conditions insure that the protein will be more completely broken down and a product of smaller molecular size will be produced. Irrespective of the amount of breakdown of the protein, the reactive groups available for acylation will be substantially the same.

For example, when a typical alkylolamine, such as diethanolamine, is reacted with the proteinaceous material under essentially anhydrous conditions and preferably under vacuum to remove any water liberated, the amidated protein will have the approximate structure,

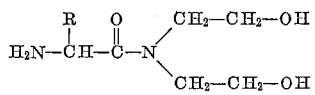

where R is the residual proteinaceous or peptide residue.

When the same proteinaceous material is reacted under similar conditions with an aliphatic polyamine such as diethylene triamine, the structures resulting are:

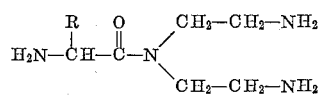

and

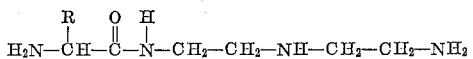

There are reactive amino hydrogens and hydroxyl hydrogens available for condensation with the acylating agent, and when these compositions are acylated either amides of the acylating agent or esters of the acylating agent are formed. Also, it is clear that available amino groups on the peptide moiety provide acylatable amino hydrogens at another place in the molecule for addition of the acyl group. Accordingly, mixtures containing varying amounts of a variety of compositions are prepared.

More specifically, the invention involves the reaction between amidated proteinaceous materials of any molecular size and fatty acids or fatty acid esters to provide high molecular weight mixtures having improved hydrophilic properties. The acylation of amidated proteinaceous materials with esters of fatty acids does not proceed as easily as acylation with the fatty acids per se, particularly where the molecular size of the peptide is large. It is desirable, therefore, where higher molecular weight amidated peptides are acylated to employ fatty acids as the acylating agent. While an amidated protein resulting from eight-hour reaction at 180° C. with a polyamine can be acylated with a triglyceride, for example, it is necessary, where the amidation reaction is carried out for only five hours at 160° C. to employ fatty acids as the acylating agent.

The acylation reaction involves heating approximately equal weights of the amidated protein and the fatty acid or fatty ester with agitation and under reduced pressure to a temperature and for a time sufficient to remove the water formed in the condensation reaction. When an ester is employed as the acylating agent, the amidated protein is not miscible with this ester, and, therefore, a convenient rough determination as to completion of the reaction is possible inasmuch as the mixture becomes homogeneous as completion of the reaction is approached.

In the case where a fatty acid is employed as the acylating agent, it is possible to determine completion of the reaction by titrating a small portion of the reaction mixture with alkali. A decrease in the amount of amine soap content is a good measure of the course of the reaction.

When the reaction is complete, the reaction product should be water-soluble so as to provide desirable detergency properties. Also at completion of the reaction, the amount of amine soap will be at a minimum.

It has been found that reaction temperatures of around 100–250° C. and reaction times of about 15 minutes to about sixteen hours result in the production of very potent surface active materials. The time and temperature of reaction are dependent upon the particular reactants employed, the degree of vacuum, color requirements with respect to the product, etc. Therefore, these variations in procedure can be adjusted as desired by those skilled in the art to obtain products having the desired surface activity.

Acylating agents which may be reacted with the amidated polypeptides include fatty acids and esters of fatty acids. Those saturated and unsaturated fatty acids having about 6 to about 22 carbon atoms are desirable acylating agents. Other fatty acids having more than 22 carbons up to around 30 carbons can be employed as the acylating agent but the aforementioned range includes those normally available from well known animal, vegetable and marine sources. The fatty acids can be unsubstituted or substituted with noninterfering substituents. Higher fatty acids (C10–C22) such as capric, lauric, myristic, palmitic, stearic, arachidic, oleic, linoleic, linolenic, etc. are preferred acylating agents. Esters of these fatty acids with lower monohydric, dihydric and polyhydric alcohols may also be employed as the acylating agent in the reaction. The lower alkyl esters of fatty acids such as the methyl through octyl alcohol esters of the fatty acids are particularly desirable. The polyhydric alcohol esters such as the glycol and glycerol esters are also very satisfactory acylating agents. Mixtures of fatty acids and mixtures of fatty acid esters may also be employed.

A wide variety of proteinaceous materials and protein hydrolysis products may be employed as the protein reactant in the process. As is noted in our previously filed application referred to above, many naturally occurring animal and vegetable proteins may be employed in the process. A typical but not exclusive group of such proteins includes glue, gelatin, blood, albumen, collagen, keratin, casein, feathers, hide trimmings, green stock, hair, offal, hoof meal, cottonseed protein, peanut protein and soybean protein.

The complex nature of the amidated protein mixture which is acylated in accordance with the present invention provides a number of reaction locations on the amidated protein molecules so that the reaction with the fatty acids and fatty acid esters proceeds to form equilibrium mixtures of (1) Amine soaps where fatty acids are employed, which as the reaction proceeds are decomposed into amides;
(2) Amides of the fatty acyl group derived from the fatty acid or its ester;
(3) Amine esters (from alkylolamines only) in which the acyl group is derived from the fatty acid or its ester;
(4) Amide esters (from alkylolamines only) wherein both acyl groups are derived from the fatty acid or its ester. Thus, a complex mixture of compositions is provided. Yet, these mixtures as compared to the unacylated, amidated proteins represent high molecular weight compositions having greatly increased surface active properties.

The examples which follow are intended to illustrate specific embodiments of the invention and should not in any sense be considered limitative.

*Example I*

The heavy, viscous, anhydrous mass resulting from the reaction between 100 grams of bone glue and 100 grams of diethanolamine by heating under a vacuum of 125 m. of mercury for 5 hours at 150° C. was mixed with 200 grams of coconut oil fatty acids. The reaction mixture under continued agitation was held under reduced pressure of 100 mm. and water was removed as the mitxure was held at 150° C. over a 5-hour period. At the end of this time the reaction mass is cooled while the vacuum is maintained and the viscous liquid reaction product is removed from the reaction vessel while hot. As the reaction product cools to approximately room temperature it assumes the form of a plastic solid. The composition is soluble in water and produces profuse sudsing in the water and an extremely stable, fine foam not readily affected by variations in alkalinity or acidity.

*Example II*

Equal parts of casein and triethylenetetramine were heated under vacuum for about 7 hours at 150° C. The amidated protein was then mixed with an equal weight of tallow fatty acids and the mixture was heated under vacuum for 4 hours at 160° C. with continuous agitation. The viscous liquid reaction product is water-soluble, exhibits excellent sudsing action even in the presence of mineral acids.

*Example III*

An amidated protein is prepared by reacting equal parts of soybean protein and diethylenetriamine by heating in a reaction vessel vacuumized to 125 mm. of mercury to a temperature of about 150–160° C. Heating is maintained for about 6 hours until all of the protein has passed into solution forming a heavy, viscous, anhydrous mass. After cooling of the reaction product an equal weight of tall oil fatty acids is added to the amidated protein and the mixture is heated with agitation to 180° C. for about 4 hours while maintainnig a vacuum of about 100 mm. The condensation product is a viscous liquid while hot and a plastic solid at room temperature. The product is soluble in a mineral acid solution with no impairment of foaming power.

*Example IV*

Equal parts of albumen and tetraethylenepentamine were charged to a reaction vessel; the reactants were subjected to vigorous agitation while the mixture was vacuumized, and temperature was increased to the boiling point of the polyamine and refluxing continued for about 5 hours. At the end of this time heat was removed from the reaction vessel and after the product had cooled an equal weight of stearic acid was added and heating and stirring under vacuum was resumed. When the temperature had reached 170° C. it was maintained and held at this level during 6 hours' reaction time. The water formed in the condensation reaction was removed during the course of the reaction. The final viscous reaction product was liquid while hot, setting to a plastic solid at room temperature. The composition was water-soluble, exhibiting strong sudsing power even in acid solution.

*Example V*

Equal weights of dried and ground hoof and horn meal and monoethanolamine were placed in the reaction vessel, vacuum was applied, and the mixture was heated. After removal of substantially all moisture from the mixture, nitrogen gas was passed through the vessel while the mixture was stirred and heated at the refluxing temperature of the amine (175° C.). After 5 hours' reaction time the mixture was cooled and an amount of coconut fatty acids equal to the reaction mixture was added to the reaction vessel. The vessel was vacuumized and heated to 180° C. with stirring and held at this temperature for 7 hours while water formed in the condensation reaction was removed. The reaction product when dissolved in water showed powerful surface active properties.

*Example VI*

Equal parts of gelatin and diisopropanolamine were treated substantially in accordance wth the amidation process set forth in the preceding example and also in application S.N. 820,848. The amidated gelatin was then mixed with an equal portion of palmitic acid and a condensation reaction conducted under vacuum by heating for 5 hours at 150° C. The amidated gelatin acylated with palmitic acid radicals produced an extremely fine, stable foam in aqueous solution.

*Example VII*

Equal parts of glue and diethanolamine were placed in the reaction vessel. The mixture was agitated vigorously and heat was applied. The vessel is evacuated to a pressure of about 125 mm. of mercury and all traces of moisture were removed. As soon as this moisture is removed the temperature is raised to the boiling point of the amine, specifically about 150–160° C. in the reaction mass at the indicated pressure. The reaction is carried out for about 8 hours, although the glue protein had all passed into solution forming a heavy, viscous, anhydrous mass after about 6 hours. The reaction product after cooling was maintained under vacuum while an equal amount of coconut oil was added. The additional condensation reaction between the coconut oil and the amidated glue was carried out for 5 hours at 150° C. with stirring. Although the coconut oil and the amidated protein were not miscible at the outset, as the reaction proceeded the solution became homogeneous. The reaction product, like the foregoing which were prepared from a fatty acid as distinguished from a fatty ester, possessed powerful detergency properties.

It is thus clear that the amidated peptide product can be combined with a variety of acylating agents including fatty acids, mixtures of fatty acids, fatty esters, and mixtures of fatty esters, as well as mixtures of fatty acids and fatty esters. Also, the resulting acylated amines and amine esters provide much higher molecular weight surface active materials than the usual amine-fatty acid condensation product.

Obviously, many modifications of the invention as hereinbefore set forth may be made without departing from the spirit and scope thereof, and therefore only such limitations should be imposed as are indicated in the appended claims.

We claim:
1. A method for manufacturing surface active compositions, which comprises: heating and reacting an amine-supplying composition having at least one acylatable amino hydrogen and selected from the group consisting of water-soluble aliphatic alkylolamines and water-soluble aliphatic polyamines with a proteinaceous composition having more than one peptide group under conditions such that there is present during the reaction less than 20% water based on the weight of said proteinaceous composition, said reaction being carried out by heating the reaction mixture at a temperature sufficient to remove water from the system, said heating being conducted until an aliquot part of the reaction product is soluble in dilute aqueous acid, whereby water-soluble amides of the constituent amino acids and polypeptides of said proteinaceous composition are formed; further heating and reacting said amidated amino acids and polypeptides with an acylating agent selected from the group consisting of carboxylic acids, carboxylic acid esters and mixtures thereof to a temperature and for a time sufficient to split out water when the said acylating agent is a carboxylic acid and to a temperature and for a time sufficient to split out an alcohol when said acylating agent is a carboxylic acid ester, whereby water-soluble, acylated amides of the constituent amino acids and polypeptides of said proteinaceous composition are formed.

2. A method for manufacturing surface active compositions, which comprises: heating and reacting an amine-supplying composition having at least one acylatable amino hydrogen and selected from the group consisting of water-soluble aliphatic alkylolamines and water-soluble aliphatic polyamines with a proteinaceous composition having more than one peptied group under conditions such that there is present during the reaction less than 20% water based on the weight of said proteinaceous composition, said reaction being carried out by removing water of condensation from the reaction mixture and conducting the reaction untial an aliquot part of the reaction product is soluble in a dilute aqueous acid, whereby water-soluble amides of the constituent amino acids and polypeptides of said proteinaceous composition are formed; further heating and reacting said amidated amino acids and polypeptides with an acylating agent selected from the group consisting of fatty acids, fatty acid esters and mixtures thereof to a temperature and for a time sufficient to split out water when said acylating agent is a fatty acid and to a temperature and for a time sufficient to split out an alcohol when said acylating agent is a fatty acid ester, whereby acylated amides of the constituent amino acids and polypeptides of said proteinaceous composition are formed.

3. The surface active compositions produced by the method of claim 2.

4. The method of claim 2 wherein the amine-supplying composition contains about 2–10 carbon atoms and is present in an amount at least equal in weight to the amount of said proteinaceous composition.

5. The method of claim 2 wherein the acylating agent is a fatty acid having about 6–22 carbon atoms.

6. The method of claim 2 wherein the acylating agent is an ester of a fatty acid having about 6–22 carbon atoms and a lower aliphatic alcohol.

7. A method for manufacturing surface active compositions, which comprises: heating and reacting an amine-supplying composition having about 2–10 carbons and having at least one acylatable amino hydrogen and selected from the group consisting of water-soluble aliphatic alkylolamines and water-soluble aliphatic polyamines with a proteinaceous composition having more than one peptide group, said amine-supplying composition being present in an amount at least equal in weight to the amount of said proteinaceous composition, said reaction being conducted under conditions such that there is present during the reaction less than 20% water based on the weight of said proteinaceous material, said reaction being carried out by heating the reaction mixture at a temperature sufficient to boil off water of condensation and maintaining said temperature until an aliquot part of the reaction product is soluble in a cold, aqueous solution having a pH of less than 4.0, whereby water-soluble amides of the constituent amino acids and polypeptides of said proteinaceous composition are formed; further heating and reacting said amidated amino acids and polypeptides with a higher fatty acid at a temperature sufficient to remove water of condensation, whereby water-soluble, acylated amides of the constituent amino acids and polypeptides of said proteinaceous composition are formed.

8. The method of claim 7 wherein the higher fatty acid is present in an amount approximately equal in weight to the amount of the amidated polypeptides and amidated amino acids and wherein the higher fatty acid is reacted with the amidated amino acids and amidated polypeptides for about fifteen minutes to about sixteen hours.

References Cited in the file of this patent

UNITED STATES PATENTS

| | | |
|---|---|---|
| 2,041,265 | Orthner et al. | May 19, 1936 |
| 2,143,023 | Meigs | Jan. 10, 1939 |
| 2,173,448 | Katzman et al. | Sept. 19, 1939 |
| 2,267,205 | Kyrides | Dec. 23, 1941 |

FOREIGN PATENTS

| | | |
|---|---|---|
| 205,395 | Great Britain | Oct. 18, 1923 |

OTHER REFERENCES

Mizushima et al.: J.A.C.S. 73 (1330–33) 1951.